United States Patent [19]

Walker

[11] 3,897,592

[45] July 29, 1975

[54] VOICE-OPERATED TRANSMIT SYSTEM

[76] Inventor: Billy E. Walker, 37195 Lombardy Ave., Barstow, Calif. 92311

[22] Filed: May 11, 1973

[21] Appl. No.: 359,291

[52] U.S. Cl. .............................. 179/41 A; 179/1 VC

[51] Int. Cl.² ............................................ H04Q 7/00

[58] Field of Search ..... 179/41 A, 2 H, 81 B, 1 VC; 325/55, 64

[56] References Cited

UNITED STATES PATENTS

| | | | |
|---|---|---|---|
| 2,424,069 | 7/1947 | Tschumi | 179/1 VC |
| 2,564,660 | 8/1951 | Allen | 179/41 A |
| 2,819,340 | 1/1958 | Brody | 179/1 VC |
| 2,951,123 | 9/1960 | De Vito | 179/1 VC |
| 2,964,598 | 12/1960 | Parker | 179/81 B |
| 3,189,690 | 6/1965 | Millett | 179/81 B |
| 3,730,995 | 5/1973 | Mathews | 179/1 VC |

FOREIGN PATENTS OR APPLICATIONS

| | | | |
|---|---|---|---|
| 1,513,454 | 4/1965 | Germany | 179/1 VC |

OTHER PUBLICATIONS

Abstract – Sound Actuated Relay, Kent, Published 6-30-1953.

*Primary Examiner*—Kathleen H. Claffy
*Assistant Examiner*—Gerald L. Brigance
*Attorney, Agent, or Firm*—R. S. Sciascia; P. N. Critchlow

[57] ABSTRACT

Control apparatus is provided to intercommunicate transmit-receive systems such as radio sets one with another or with a telephone network. First and second signal processors convert a signal input from either of the systems into a form capable of energizing a switch which, in turn, closes a relay coupling the input from one system into the other. Also, the circuit for applying the incoming signal to either one of the signal processors, such as the first processor, includes a normally-closed relay of the switch of the other processor, i.e., the second processor. Therefore, intercommunication is voice-operated since and incoming audio signal transmitted into either system activates a switch of that system to communicate its transmitting system with the other. Activation of that switch utilizes the normally-closed relay of the other switch. Return transmissions are handled in a reverse but otherwise is identical manner.

4 Claims, 2 Drawing Figures

VOICE-OPERATED TRANSMIT SYSTEM

BACKGROUND OF THE INVENTION

The present invention relates to voice-operated communication systems and, in particular, to automatic systems for intercommunicating radio sets and telephone networks or for enabling retransmission between the radio sets.

The Marine Corps, particularly the aircraft wings of the Corps for sometime have recognized and sought to overcome certain limitations inherent in existing voice-communication systems. For example, although it obviously is highly desirable to have the capability of patching existing radio sets (AM, FM, VHF, UHF) into a telephone system which, in turn, can be interconnected into the entire network including overseas calls this capability apparently has not been achieved in a simple and versatile manner. In addition, there have been problems in providing remote airborne or grounded radio sets. There are, of course, a variety of systems in present use. However, generally considered, the present systems are designed to operate with particular families of equipment and each presents special problems such as the need for remote turn-on and turn-off operations, tone operations intercom etc. Further, to establish intercommunication between the radio set and existing telephone equipment, a number of the present sets require a microphone keying system which, in turn, negates use of certain of the telephone equipments. Also, for the most part, present systems require constant monitoring by a switchboard operator capable of controlling a transmit and receive switch as circuit conditions require. In brief, the need for a low cost, easily maintained, voice-operated patch system which can be used either as a phone patch or in an unattended retransmission mode for unusual radio sets, apparently has not been successfully implemented at least insofar as military needs are concerned. In this regard, it is recognized that military needs include the need for secure networks for transmitting sensitive information.

As the term implies, "voice-operated" systems contemplate primarily systems in which an audio input from one remote transmission is capable of establishing the circuit conditions needed for communication with another remote system, although, as will be recognized, systems such as the one presently to be described, do not necessarily have to be limited to voice or audio inputs.

One of the principle objects of the present invention is to provide a so-called voice-operated intercommunication system having the capability of extending the existing interfacing potential to a wide variety of radio sets as well as a telephone network.

Another object is to provide this extended capability in a low cost, easily-maintained, reliable manner that does not degrade the transmissions.

A further object is to accomplish the foregoing objects in a simple manner that avoids the use of specialized equipment or facilities which otherwise might limit the use to particular families of existing equipments.

Yet another object is to provide a voice-operated system capable of replacing many of the existing remote systems including the special facilities and equipments needed for these existing remote systems.

A special object involving principally military needs, is to provide a remoting communications system capable of use in secure networks.

In a general manner these and other objects which will become apparent, are accomplished by employing at least a pair of switching devices or mechanisms, each of the switches being controlled by a signal processor to establish the desired remote communication. In particular, an incoming audio signal is passed through one of the switches to the signal processor of the other switch to activate this other switch and, in turn, establish the communication. Communication in the reverse direction is passed through the first-mentioned switch to the signal processor of the second switch to again establish the conditions needed for the return communication.

BRIEF DESCRIPTION OF THE DRAWINGS

The present invention is illustrated in the accompanying drawings of which.

DETAILED DESCRIPTION OF THE INVENTION

Figure 1:
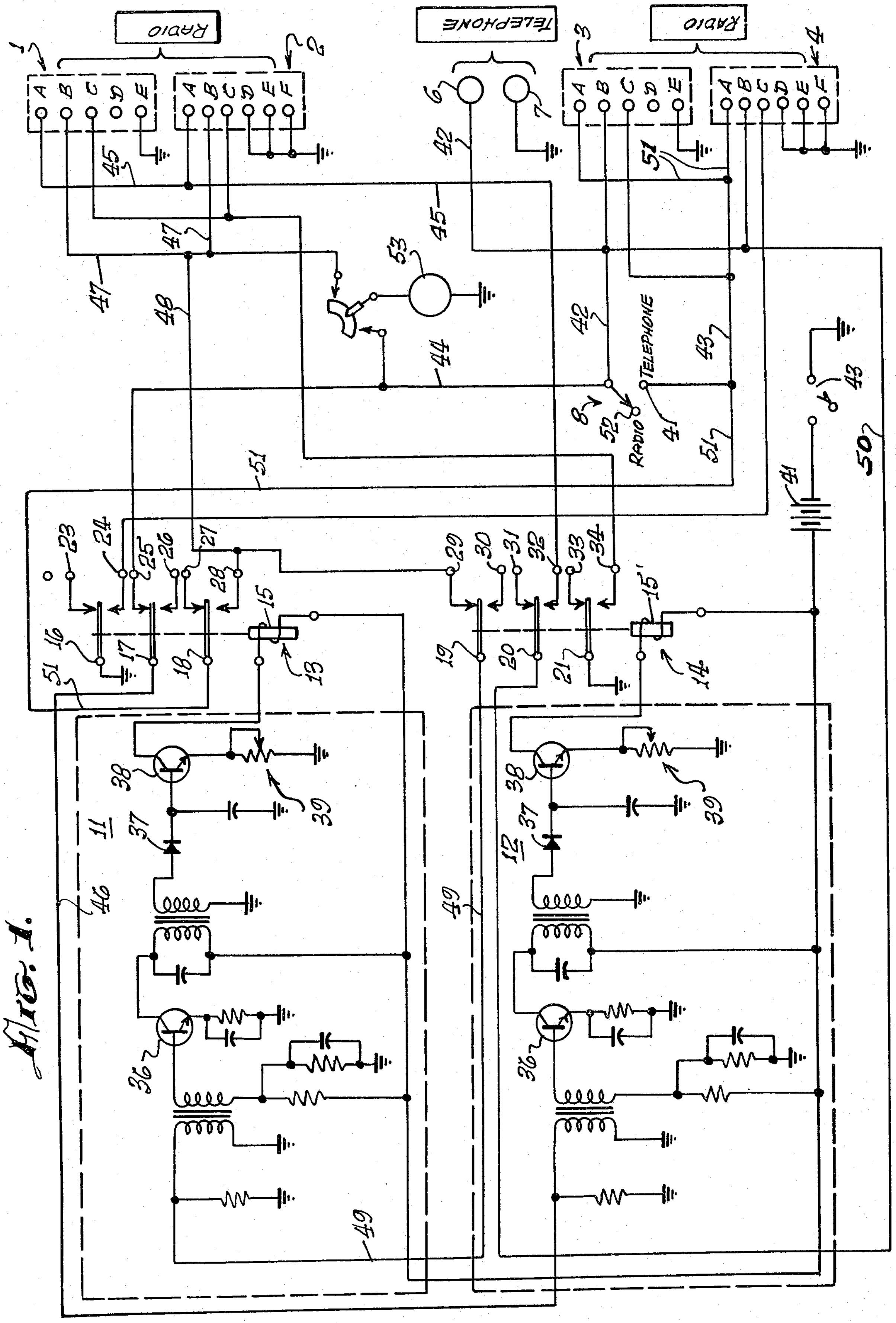
FIG. 1 is a schematic electrical diagram of the major portion of the present patch network.

Referring to FIG. 1, the control or patch apparatus includes signal input and output panels 1, 2, 3 and 4, each panel including a number of pins identified in the drawing as pins A, B, C, D, E and F. The panels are grounded in the illustrated manner, and, with the exception of pins D of panels 1 and 3, the pins are coupled into the network for purposes which will be described. The unused pins are made available for other purposes which are not presently pertinent. FIG. 1 also shows a pair of circles 6 and 7 bearing the legend "Telephone," these circles identifying panels and jacks used to couple the present network into a telephone system so that any of the illustrated radios can be patched into the telephone system, or the radios can be interfaced one with the other. Normally a switchboard operator mans the telephone panel although his primary function, insofar as the present apparatus is concerned, is to operate a "radio-telephone" switch 8 to establish the circuit conditions needed for an otherwise automatic voice-operated intercommunication.

As will be appreciated, panels 1–4 are a part of the present control apparatus. These panels are links between remotely-located radio sets which, for example, might be airborne, and the telephone network or other radio sets linked to panels 3 and 4. In other words, these panels provide the signal inputs for the illustrated control apparatus network and they also provide the outputs needed to relay, for example, telephonic communication to one of the remote radio sets.

The illustrated network or circuitry of FIG. 1 can be sub-divided into several major components, these being a pair of identical signal processors 11 and 12 each of which includes the components shown in the dotted line blocks of FIG. 1, and a pair of switching devices 13 and 14 each of which includes a solenoid 15, 15$^1$ mechanically coupled or ganged to a plurality of switch arms or relays 16–21 movable between a pair of contact points to open or close circuits coupled to these arms and points. In the drawing, the contact points are identified by their pins 23–33. Since switching devices 13 and 14, as well as signal processors 11 and 12, are identical, subsequent description of one can be considered applicable to both.

Each of the signal processors includes an audio amplifier 36, rectifying means 37 and a dc amplifier 38, the dc amplifier having a potentiometer control 39 which controls the length of time during which the solenoids fed by this amplifier are activated. Power for the various components may be provided by a battery 41 grounded through an 'on and off' switch 43. Each processor also incorporates transformers and other recognizable circuit components conventially used for dc and ac amplification.

Other components of the control network best can be understood by considering several modes of operation. First considering the radio-telephone operation, the operator at the switchboard first positions radio-telephone switch 8 in the telephone position in which it contacts pin 41. With the switch so positioned, an audio signal received at pin 6 of the telephone panel is conducted to audio amplifier 36 of signal processor 12 through an electrical circuit including lines 42 and 44, switch points 25–17 of solenoid 13 and line 46. It will be noted that double throw switch arm 17 normally closes this circuit to signal processor 12 and, further, that the circuit to signal processor 12 includes the switch of signal processor 11. In the processor, the audio signal is amplified, rectified and applied to the base of amplifier 38 causing it to conduct so as to energize the coil of solenoid 14 to activate the double-throw switch arms 19, 20 and 21. When solenoid 14 is energized, the signal being received at pins 6 and 7 of the telephone panel is applied to microphone input pins A of panels 1 and 2 through line 50 pins 20 and 32 of switching mechanism 14 and line 45. Simultaneously pins 21–34 close a circuit between ground and pins C of panels 1 and 2 thus keying the transmitter of a radio connected to either panels 1 or 2. In this manner, the audio signal derived from the telephone network is supplied to the radio sets coupled to either panels 1 or 2. As has been noted, the length of the time during which solenoid 15 is energized is determined by an adjustment of potentiometer 39, the obvious purpose of this arrangement being to allow for a reasonable dwell interval before the solenoid de-energizes and the communication line between the telephone and the radio sets reopens.

When a signal input is received by panels 1 or 2, the network functions in essentially the same manner to permit this audio input to be conducted to pins 6 and 7 of the telephone panel. Thus, an input to panels 1 or 2 can be considered as being felt at pins B of these panels and this input is initially applied through switching mechanism 14 of signal processor 12 to audio amplifier 36 of signal processor 11. In greater detail, the input is applied to processor 11 through lines 47 and 48, pins 29–19 of switching mechanism 14, and line 49. Signal processor 11 performs the same functions as processor 12 to energize switching mechanism 13 and cause its switch arm to reverse their illustrated contacts. Similarly, the time interval of the energization of the solenoid is responsive to its potentiometer 39. When switching mechanism 13 is energized, the audio input from radio sets can proceed to the telephone panel through previously-mentioned line 48, pins 18–28, line 51, radio-telephone switch 8 and line 42. In this manner, two-way, voice-operated communication is established between radio sets coupled to panels 1 and 2 and a telephone network coupled to the telephone panel.

As has been mentioned, the same system can be used to couple or interface radio sets coupled to panels 3 and 4 with the radio sets coupled with panels 1 and 2, the control unit then functioning to enable automatic, unattended retransmission between these sets. To establish the circuit conditions needed for such retransmission, the operator first moves switch 8 to its illustrated "radio" position in which its arm is contacting pin 52. Also a conventional "VU" meter 53 is provided to enable the operator to set the audio level of both receivers. With the circuit so set, an audio signal input felt at pins B of panels 3 or 4, first is applied to signal processor 12 through lines 42 and 44, contacts 17–25 of switching mechanism 13, and line 46. Energization of solenoid 15′ of this mechanism closes the communication circuit between the radio sets by closing contact pins 20–32. As will be noted, this retransmission communication is achieved in essentially the same manner as was the previously-described communication between the telephone and the radio sets of panels 1 and 2. To communicate in the reverse direction, audio signal inputs felt at pins B of panels 1 or 2 are applied to pins A of panels 3 or 4 in a manner identical to that already described with reference to the circuitry needed to conduct the signal input at panels 1 and 2 to the telephone. This operation should be readily understandable without specific, detailed description.

Figure 2:
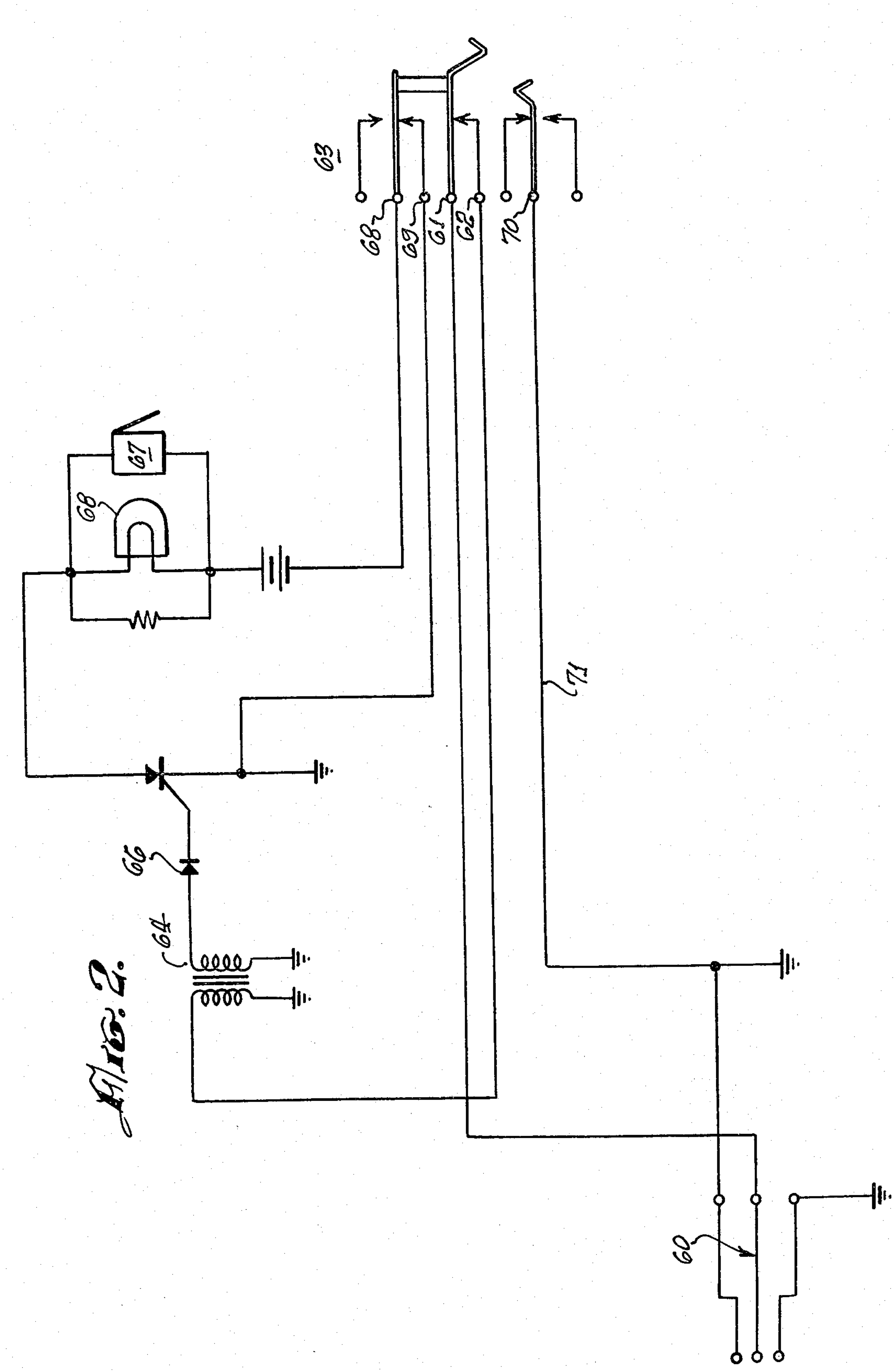
FIG. 2 is another schematic showing a special 'Switchboard Operator Alarm' adapted for use with the network of FIG. 1.

FIG. 2 illustrates a switchboard operator alarm which is a device capable of being plugged into a drop of the switchboard used with the present apparatus and, as will be seen, a telephone line also is connected to that drop. When a signal is received from the radio circuit, the signal is applied to the ring of plug 60 from which it is conducted through pins 61–62 of panel 63 to a transformer 64 causing SCR 66 to conduct so as to activate buzzer 67 and light lamp 68. The lamp and buzzer remain activated until the operator plugs an answer cord into panel 63, this connection deactivating the buzzer and lamp by breaking contacts 68–69 and, simultaneously, connecting the radio circuit through contacts 69–70 to telephone line 71. A switchboard operator alarm of this type provides a simple and effective manner of alerting an operator to permit the operator to establish circuit conditions in the control apparatus enabling intercommunication between the radio sets.

The operation of the present control apparatus should be readily apparent from the foregoing description. Also, it should be apparent that the particular circuit configuration, as well as the parts or components used in it, represent only one implementation of the inventive concept and that within the scope of the claims other arrangements using perhaps more sophisticated components or parts can be substituted. From an economical point of view, is inexpensive, small, light weight and extremely reliable due to the small number of parts utilized. Further, the circuit is easily maintained and it requires no specialized equipment such as might have to be specially designed or purchased. Most of the parts should be readily available in normal supply systems.

The present apparatus has been successfully tested by the Marine Corps in a number of rather unusual couplings. In particular, its capability of enabling any person having access to an FM radio set to call a base station and be integrated into a wire system using dial or field telephone sets has been demonstrated. Also, the apparatus has allowed retransmission between such unusual radio sets as the AN/TRC-25 and AN/GRC-48, the latter being a AM UHF radio set and the former an FM VHF set. In this coupling, unattended automatic retransmission was employed and the quality of audio at either extremity of the circuit was not degraded and no untoward characteristics in the relay system were noted. Consequently, this equipment appears capable of interfacing any two radios particularly those having a squelch capability. Other equipment which has been tested on a trial basis has been a TSEG/KY-8 with the AM UHF radio set AN/GRC-48, this coupling providing a secure network on UHF. Again, users of the system have reported no degredation in circuit operation. In general the utilization of the present apparatus results in significant benefits due not only to the wide diversity of tasks capable of being formed but also due to the savings made possible by the elimination of certain specialized equipment.

Obviously many modifications and variations of the present invention are possible in the light of the above teachings. It is therefore to be understood that within the scope of the appended claims the invention may be practiced otherwise than as specifically described.

I claim:

1. Control apparatus for intercommunicating remotely-located transmit-receive systems at least one of which is a radio system comprising:

- a signal input and a signal output means for each of said systems, the input means applying a signal derived from a transmit-receive system to the control apparatus and the output means applying a signal derived from the control apparatus to a transmit-receive system, and
- an electrical transmission system for each of said transmit-receive systems
- each of said transmission systems including:
  - a pair of switching mechanisms each including a solenoid and a plurality of switches ganged to said solenoid, each of said ganged plurality including a normally-open and a normally-closed switch,
  - a pair of electrical transmission circuit, each circuit of said pair coupling signal input means of one of said systems to said signal output means of the other system, and
- each of said transmission circuits including a separate one of said normally-open switches whereby each circuit is normally-open,
- a pair of switch control circuits, each circuit of said pair coupling said signal input means of each one of said systems directly to a separate one of said solenoids,
- each of said control circuits including a separate one of said normally-closed switches whereby the signal input energy is applied through said switches to said solenoids,
- each of said switch control circuits further including means for processing said signal inputs energy into a form capable of energizing said solenoids,
- whereby the signal input into either systems energizes one of said switching mechanisms to close its normally-open transmission circuit and apply the input to said signal output of the other system,
- each of said ganged switching mechanisms further including a second normally-open and grounded switch electrically coupled to said signal output means of said radio system whereby said solenoid energization closes said second switch for grounding and keying the transmitter of the radio system.

2. The apparatus of claim 1 wherein said apparatus is adapted to intercommunicate radio sets one with another and with a telephonic system, said apparatus including an operator-controlled switch for selectively establishing the desired intercommunication.

3. The apparatus of claim 2 wherein said operator-controlled switch is disposed in the electrical transmission circuit coupling the signal input of a radio set into the telephonic system for permitting said operator to monitor radio signal inputs.

4. The apparatus of claim 3 further including signalling means responsive to the presence of a signal input into said telephonic system to alert said operator to enable said desired intercommunication to be established by manual operation of said switch.

* * * * *